(12) United States Patent
Shen

(10) Patent No.: US 7,324,733 B2
(45) Date of Patent: Jan. 29, 2008

(54) FRAMELESS HOLLOW ROOF MIRROR AND METHOD OF MANUFACTURE

(75) Inventor: Dar Tson Shen, West Vancouver (CA)

(73) Assignee: Pacific Telescope Corporation, Richmond, British Columbia (CA)

( * ) Notice: Subject to any disclaimer, the term of this patent is extended or adjusted under 35 U.S.C. 154(b) by 84 days.

(21) Appl. No.: 11/085,941

(22) Filed: Mar. 21, 2005

(65) Prior Publication Data

US 2006/0210235 A1   Sep. 21, 2006

(51) Int. Cl.
  *G02B 6/00* (2006.01)
  *G02B 5/08* (2006.01)
  *G02B 5/26* (2006.01)
  *G02B 5/10* (2006.01)

(52) U.S. Cl. .................. 385/147; 359/855; 359/856; 359/864; 359/884

(58) Field of Classification Search ............ 359/855, 359/856, 864, 884; 385/147
See application file for complete search history.

(56) References Cited

U.S. PATENT DOCUMENTS

| | | | | |
|---|---|---|---|---|
| 3,663,084 A | * | 5/1972 | Lipkins | 359/529 |
| 4,065,204 A | * | 12/1977 | Lipkins | 359/529 |
| 5,024,514 A | * | 6/1991 | Bleier et al. | 359/855 |
| 5,130,840 A | * | 7/1992 | Iima et al. | 359/220 |
| 5,335,111 A | * | 8/1994 | Bleier | 359/529 |
| 6,729,735 B2 | * | 5/2004 | Bleier | 359/856 |
| 6,945,661 B2 | * | 9/2005 | Bleier | 359/856 |
| 2002/0131727 A1 | * | 9/2002 | Reedy et al. | 385/88 |
| 2003/0230114 A1 | * | 12/2003 | Minamikawa | 65/33.5 |
| 2005/0190810 A1 | * | 9/2005 | Butterworth et al. | 372/70 |

* cited by examiner

*Primary Examiner*—Michelle Connelly-Cushwa
*Assistant Examiner*—Rhonda S. Peace
(74) *Attorney, Agent, or Firm*—Brian L. Johnson; David H. Deits; Davis Wright Tremaine LLP

(57) ABSTRACT

The present invention relates to optical components for reversing and inverting images, and to methods of manufacturing them accurately, robustly and cost-effectively. The method includes optical contact bonding a first optical element and a second optical element and adhesively bonding the first optical element and the second optical element. Adhesively bonding might include forming a notch into the second optical element and depositing a bead of adhesive into the notch, such that the adhesive adheres to both the notch and the first optical element.

25 Claims, 3 Drawing Sheets

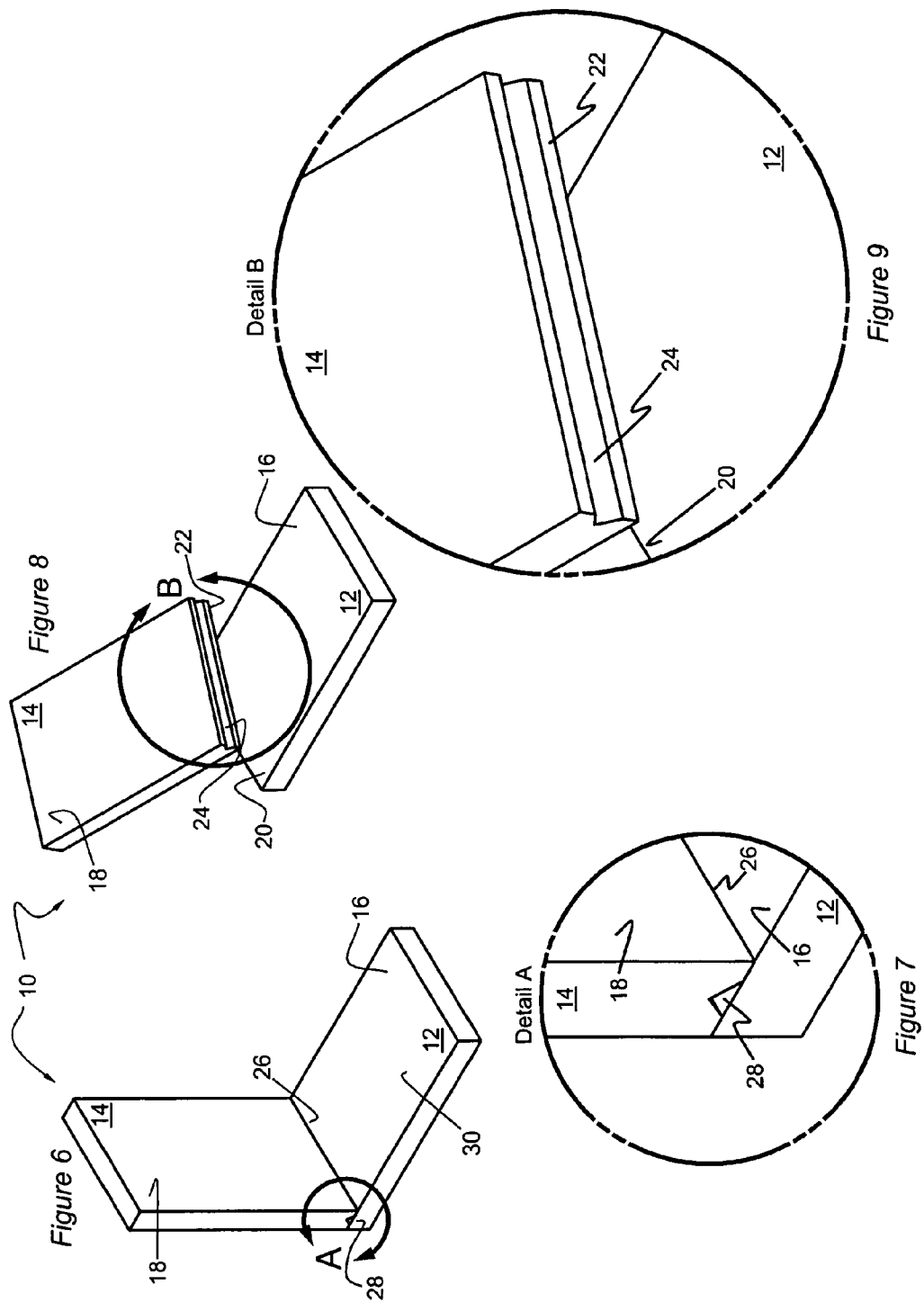

FRAMELESS HOLLOW ROOF MIRROR AND METHOD OF MANUFACTURE

BACKGROUND OF THE INVENTION

1. Field of the Invention

The present invention relates to optical components for reversing and inverting images, and to methods of manufacturing them accurately, robustly and cost-effectively. More specifically, the present invention relates to the efficient manufacture of a frameless hollow roof mirror constructed from two plane mirrors joined together by optical contact bonding.

2. Description of Related Art

Sometimes optical systems, for example those associated with telescopes and microscopes, must be configured to reverse and/or invert an image of an object.

As is well-known and illustrated in FIG. 1, a plane mirror PM is a simple component for inverting an image I of an object O. As is also well-known and illustrated in FIG. 2, two plane mirrors PM disposed at a right angle form a hollow roof mirror HRM, which is a simple component for both inverting and reversing an image I of an object O.

Unfortunately, it has proven challenging to build hollow roof mirrors HRM accurately and robustly at reasonable cost and weight. Abutting two delicate plane mirrors PM into a roof configuration demands exacting tolerances during manufacture and assembly. Tiny gaps or misalignments tend to deform or destroy the optical path, as can excess of the adhesive commonly used to retain the plane mirrors PM in a roof configuration.

The problem of misaligned elements is also a concern in terms of durability. Over time, or through extended or extreme use, poorly designed elements that were originally aligned might slip out of alignment.

These manufacturing, assembly, and durability issues are important in many precision applications, for example in optical components associated with sensitive measurement instruments such as telescopes and microscopes. The challenges have been particularly present in manufacturing telescopes and telescope accessories because they must be sufficiently robust to survive use in the field. They must survive vibrations during transportation to the field. They must survive temperature changes between storage, transportation, and field environments. They must survive bad weather in the field. And they must resist impact damage from hard use.

As illustrated in FIG. 3, one approach to satisfying these challenges has been to substitute two solid roof prisms SRP for a hollow roof mirror, for example configuring two solid roof prisms SRP into a Porro prism PP. So configured, the solid roof prisms SRPs take advantage of the phenomenon of total internal reflection to function as reflectors, not refractors. Light entering the solid roof prism SRP through a transmission facet TF exits though the same transmission facet TF, after being twice internally reflected by reflection facets RF.

Solid roof prisms SRP and Porro prisms PP have the advantage of being more robust than hollow roof mirrors HRM. The reflection surfaces of the reflection facets RF being within the prism, the prism material is in essence being used as both reflector and frame. However, solid roof prisms SRP also have significant disadvantages, most critically that they are expensive to manufacture, particularly in larger sizes. High-quality glass must be carefully pressure-shaped under extreme heat and then slowly cooled; however, even when great care is taken, this heating/cooling process still has a tendency to cause defects within the prism that can deform or destroy the optical path.

As illustrated in FIG. 4, another approach to satisfying these challenges has been to abut two prisms P together to create a hollow roof between them, by applying a reflective coating to the exterior surface of one facet on each prism (the reflection facets RF) and disposing the two reflection facets RF to form a right angle between them. Such a hollow roof prism HRP has a number of advantages. It is relatively robust and the interior of the component prisms P need not be free of optical defects, because the optical path remains outside the hollow roof prism HRP. However, it also has disadvantages. The component prisms P are still more challenging to manufacture than simple plane mirrors and if they are misaligned during assembly or use, they may not form an optically accurate roof.

As illustrated in FIG. 5, still another approach to satisfying these challenges has been to build a framed hollow roof mirror FHRM, by disposing two plane mirrors PM at a right angle to form a roof and supporting the plane mirrors PM with various frame components, for example a base B, opposing lateral supports LS, a plurality of shock-damping connectors SDC, and opposing end-braces EB, one of which has been hidden from view in FIG. 5 so as not to obscure the other items. While a framed hollow roof mirror FHRM benefits from the advantages that plane mirrors PM provide over prisms, it also suffers from the disadvantages inherent in a framing mechanism, for example additional weight and manufacturing and maintenance complications. Furthermore, it is generally difficult to form a fine junction between the two plane mirrors PM at the apex of the roof and to maintain that junction during use.

Accordingly, what is needed is a better way to manufacture and assemble a robust frameless hollow roof mirror.

SUMMARY OF THE INVENTION

The present invention is directed to this need.

According to one aspect of the present invention, there is provided a method of connecting a first element to a second element in an optical system, the first element having a first optical interface and the second element having a second optical interface. The method includes optical contact bonding the first element and the second element and adhesively bonding the first element and the second element.

In one embodiment, optical contact bonding includes forming a first abutment on the first element, forming a second abutment on the second element, and pressing the first abutment into contact with the second abutment. Forming an abutment could include molding an element to have an abutment, grinding an abutment, or polishing an abutment.

In another embodiment, adhesively bonding includes forming a notch into the second abutment and depositing a bead of adhesive into the notch, such that the adhesive adheres to both the notch and the first abutment when the first abutment is pressed into contact with the second abutment.

In still another embodiment, the method includes disposing the first element and the second element into a roof configuration, wherein the first optical interface and the second optical interface meet at a junction. This configuration could be accomplished by forming the first abutment adjacent to and coplanar with the first optical interface and forming the second abutment adjacent to but not coplanar with the second optical interface. In this embodiment, the first optical interface and the second optical interface might be intermingled through optical contact bonding to form a continuous optical interface through the junction. Additionally, the method might include depositing an optical coating on the intermingled first optical interface and the second optical interface.

According to another aspect of the invention, there is provided an apparatus having a first element with a first optical interface, a second element with a second optical interface, an optical contact bond between the first element and the second element, and an adhesive bond between the first element and the second element.

In one embodiment, the first element has a first abutment, the second element has a second abutment, and the optical contact bond exists between the first abutment and the second abutment.

In another embodiment, the second abutment defines a notch and the adhesive bond includes a bead of adhesive deposited within the notch, such that the adhesive adheres to both the notch and the first abutment when the first abutment is adjacent the second abutment.

In still another embodiment, the first element and the second element are in a roof configuration, wherein the first optical interface and the second optical interface meet at a junction. In this configuration, the first abutment is adjacent to and coplanar with the first optical interface and the second abutment is adjacent to but not coplanar with the second optical interface. So configured, the first optical interface and the second optical interface intermingle at the optical contact bond, forming a continuous optical interface through the junction. Additionally, an optical coating might be deposited on the intermingled first optical interface and second optical interface.

According to yet another aspect of the invention, there is provided an optical system, comprising a first element having a first abutment, a second element having a second abutment, first means for connecting the first abutment to the second abutment, and second means for connecting the first abutment to the second abutment.

In one embodiment, the first connecting means provides the majority of the force that connects the first abutment to the second abutment and the second connecting means connects the first abutment to the second abutment when the first connecting means is not operational. Additionally, the second connecting means might urge the first connecting means to be operational.

Further aspects and advantages of the present invention will become apparent upon considering the following drawings, description, and claims.

DESCRIPTION OF THE INVENTION

The invention will be more fully illustrated by the following detailed description of specific embodiments in conjunction with the accompanying drawing figures. In the figures, similar components and/or features may have the same reference label.

BRIEF DESCRIPTION OF THE DRAWINGS

FIG. 6 is a front-right-top view of a frameless hollow roof mirror according to one embodiment of the present invention.

FIG. 7 is a front-right-top view of a portion of the frameless hollow roof mirror of FIG. 6, detailing the apex of the roof.

FIG. 8 is an exploded front-right-top view of the frameless hollow roof mirror of FIG. 6.

FIG. 9 is an exploded front-right-top view of a portion of the frameless hollow roof mirror of FIG. 6, detailing abutting surfaces at the apex of the roof.

Figure 1:
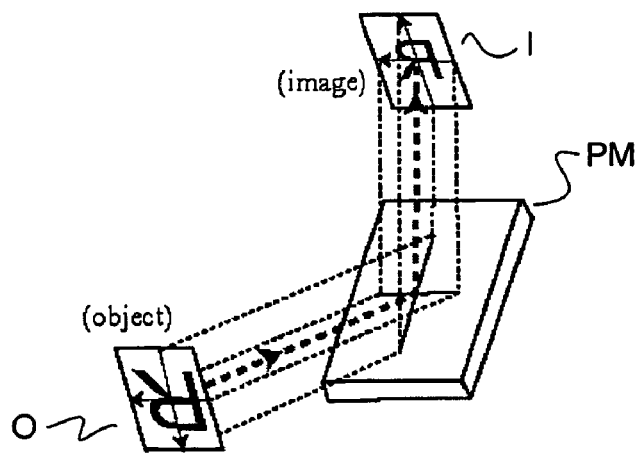
FIG. 1 is a front-right-top view of a plane mirror inverting an image of an object, according to the prior art.
Figure 2:
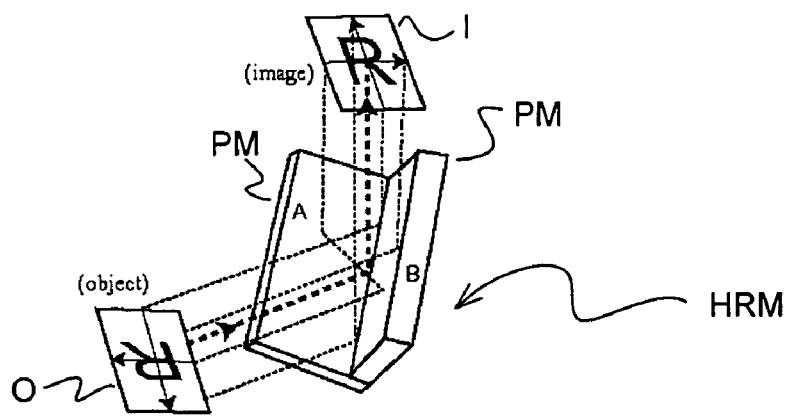
FIG. 2 is a front-top view of a hollow roof mirror inverting and reversing an image of an object, according to the prior art.
Figure 3:
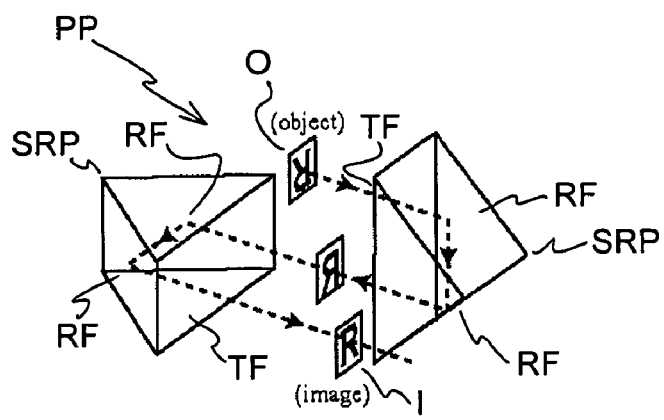
FIG. 3 is an exploded front-right-top view of a Porro prism inverting and reversing an image of an object, according to the prior art.
Figure 5:
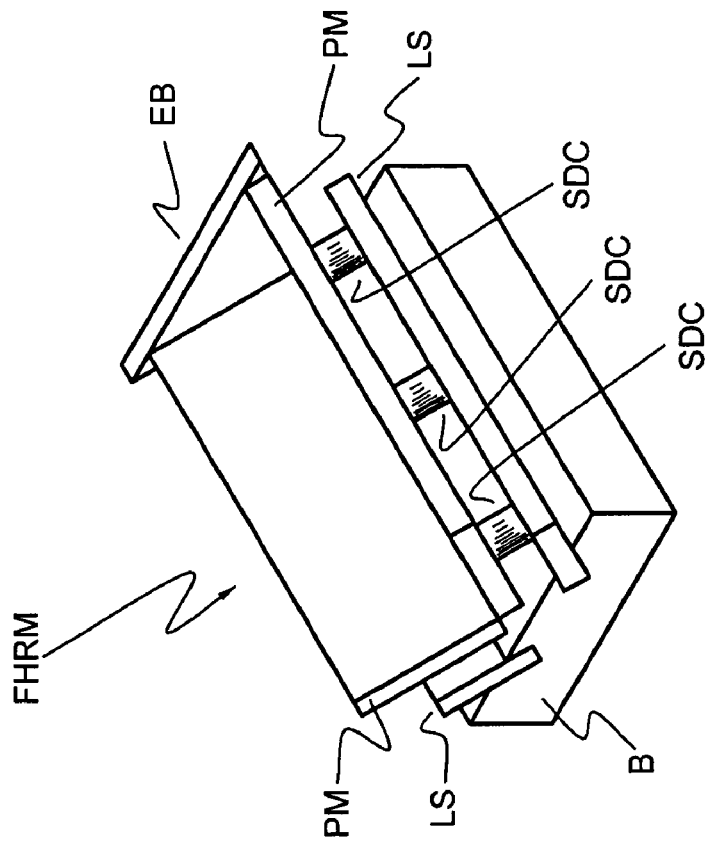
FIG. 5 is a front-right-top view of a framed hollow roof mirror according to the prior art.
Figure 4:
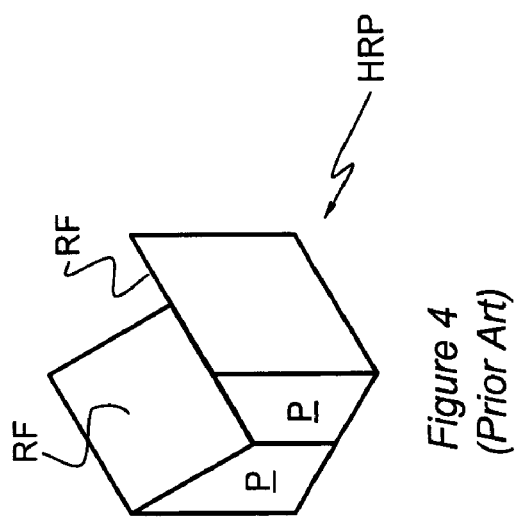
FIG. 4 is a front-right-top view of a hollow roof prism according to the prior art.

DETAILED DESCRIPTION OF SPECIFIC EMBODIMENTS (a) Structure

The structure of the invention will now be illustrated by explanation of specific exemplary embodiments shown in the drawing figures and described in greater detail herein. While specific embodiments of the invention are described and illustrated, such embodiments should be considered illustrative of the invention only and not as limiting the invention as construed in accordance with the accompanying claims.

FIGS. 6 through 9 show a frameless hollow roof mirror according to one embodiment of the present invention, generally illustrated at 10. The frameless hollow roof mirror 10 includes a first element 12 and a second element 14, which respectively have a first interface 16 and a second interface 18 for directing incident rays of light. The first interface 16 and the second interface 18 may be created by applying an optical coating, for example a reflective coating, to a substrate portion of the first element 12 and second element 14 respectively. In this embodiment, the first element 12 and second element 14 are pieces of plane glass that have been polished to achieve highly smooth surfaces.

The first element 12 and the second element 14 have respectively a first abutment 20 and a second abutment 22. The first abutment 20 is coplanar with, and may be a portion of, the first interface 16. The second abutment 22 is not coplanar with the second interface 18, but adjoins it along an inflection, herein depicted as a sharp edge.

As assembled into the frameless hollow roof mirror 10, the first element 12 and the second element 14 are abuttingly placed or fixed together, the first abutment 20 abutting the second abutment 22 so as to align the first interface 16 and the second interface 18 to meet along a junction 26, thereby forming a roof configuration.

The first abutment 20 and second abutment 22 are retained in this disposition by optical contact bonding. Besides providing a tremendously strong retention force, the atomic nature of optical contact bonding provides an optically clean junction 26 between the first interface 16 and the second interface 18, their surfaces in effect intermingling to form a continuous surface across the junction 26. Additionally, the first interface 16 and the second interface 18 may act as a substrate for an optical coating 30 applied after bonding, for example a reflective coating, to form an even more uniform interface and further improve optical characteristics.

Additionally, the second abutment 22 may also include an elongated notch 24 adapted to retain a bead of adhesive 28, for example an epoxy or glue, for engagement with the first abutment 20, the notch 24 and bead of adhesive 28 being small enough not to cause misalignment or obstruction in the frameless hollow roof mirror 10. In this arrangement, the optical contact bonding provides the main bonding strength most of the time; however, should the optical contact bond temporarily fail, the adhesive bonding provided by the bead of adhesive 28 will hold the frameless hollow roof mirror 10 in alignment until the optical contact bond reestablishes itself.

In certain optical applications, it is desirable that the first interface 16 and the second interface 18 form an angle at the junction 26 that, to a high degree of accuracy and precision, for example ten arc seconds, is equal to ninety degrees. It has been found that the present invention is well suited to such accurate and precise manufacturing.

Although not required to obtain the benefits and advantages of the present invention, in this embodiment the first element 12 and second element 14 are characterized by having the shape of rectangular slabs, a shape that is particularly suited to inexpensive and accurate manufacture.

The notch 24 need not have the shape shown or extend across the whole of the second element 14. Furthermore, more than one notch 24 might be use to retain beads of adhesive 28. Alternatively, the first element 12 might be notched or neither element 12, 14 might be notched, with one or more beads of adhesive being applied so as not to interfere with the optical contact bonding or the junction 26.

(b) Operation

The construction of specific embodiments of the invention will now be described, with reference to FIGS. 6 through 9.

In general, the frameless hollow roof mirror 10 is constructed by both optical contact bonding and adhesively bonding the first element 12 to the second element 14.

For successful optical contact bonding, the bonding surfaces, in this case the first abutment 20 and the second abutment 22, must be carefully formed and then pressed together. The surfaces of the first abutment 20 and the second abutment 22 must be made exceedingly flat, smooth and clean, such that the actual surface atoms on the first abutment 20 and second abutment 22 provide bonding forces between them to resist separation except upon the application of a significant separation force or significant temperature change. It has been found that a flatness of $\lambda/4$ is sufficient. To accomplish this end, the abutments 20, 22 might be formed through molding, grinding, polishing, or a combination of these or other manufacturing operations.

For successful adhesive bonding, the notch 24 is formed into the second abutment 22 and a bead of adhesive 28 deposited into the notch 24, such that the adhesive 28 adheres to both the notch 24 and the first abutment 20 when the first abutment 20 is pressed into contact with the second abutment 22. The notch 24 might be molded or ground into the second abutment 22.

A reflective optical coating 30 can then be deposited on the substrates presented by the first interface 16 and the second interface 18, to form an even more uniform interface and further improve optical characteristics.

So bonded together and coated, the first element 12 and the second element 14 form a simple and robust frameless hollow roof mirror 10, presenting a continuous optical interface across their junction 26, the first interface 16 and the second interface 18 intermingling through the optical contact bond.

(c) Description Summary

Thus, it will be seen from the foregoing embodiments and examples that there has been described a way to align the optical interfaces of adjacent optical elements in an optical system through a combination of optical contact bonding and adhesive bonding.

While specific embodiments of the invention have been described and illustrated, such embodiments should be considered illustrative of the invention only and not as limiting the invention as construed in accordance with the accompanying claims.

It will be understood by those skilled in the art that various changes, modifications and substitutions can be made to the foregoing embodiments without departing from the principle and scope of the invention expressed in the claims made herein.

What is claimed is:

1. A method of connecting a first element to a second element in an optical system, the method comprising:
   providing the first element with a first abutment and a first optical interface;
   providing the second element with a second abutment and a second optical interface;
   optical contact bonding the first abutment of the first element and the second abutment of the second element; and
   adhesively bonding the first abutment of the first element and the second abutment of the second elements;
   wherein optical contact bonding the first and second abutments comprises providing the first and second abutments with a flatness of $\lambda/4$ or less and pressing the first abutment into contact with the second abutment to obtain bonding forces between atoms of the first and second abutments; and
   wherein adhesively bonding the first and second abutments comprises maintaining the first and second optical interfaces free of adhesive to avoid impairing optical properties of the first and second optical interfaces.

2. A method as claimed in claim 1, wherein providing the first element with the first abutment comprises one or more of:
   molding the first element to have the first abutment;
   grinding the first element to have the first abutment; and polishing the first abutment.

3. A method as claimed in claim 1, wherein adhesively bonding the first and second abutments comprises:
   (a) forming a notch into the second abutment; and
   (b) depositing a bead of adhesive into the notch, such that the adhesive adheres to both the notch and the first abutment when the first abutment is pressed into contact with the second abutment.

4. A method as claimed in claim 1, further comprising disposing the first element and the second element into a roof configuration, wherein the first optical interface and the second optical interface meet at a junction.

5. A method as claimed in claim 4, wherein:
   (a) providing the first element with the first abutment comprises forming the first abutment adjacent to and coplanar with the first optical interface; and
   (b) providing the second element with the second abutment comprises forming the second abutment adjacent to but not coplanar with the second optical interface.

6. A method as claimed in claim 5, wherein optical contact bonding the first and second abutments comprises intermingling the first optical interface and the second optical interface at the junction to form a continuous optical interface.

7. A method as claimed in claim 6, further comprising depositing an optical coating on the intermingled first optical interface and the second optical interface.

8. A method as claimed in claim 4 wherein adhesively bonding the first and second abutments results in an adhesive bond and a length of the adhesive bond spans the junction between the first and second optical interfaces.

9. A method as claimed in claim 8 wherein optical contact bonding the first and second abutments results in an optical contact bond and a length of the optical contact bond spans the junction between the first and second optical interfaces.

10. A method as claimed in claim 4 wherein adhesively bonding the first and second abutments comprises forming an adhesive bond at a location spaced apart from the junction between the first and second optical interfaces.

11. A method as claimed in claim 10 wherein a length of the adhesive bond spans the junction between the first and second optical interfaces.

12. A method as claimed in claim 1 wherein optical contact bonding the first and second abutments results in an optical contact bond and adhesively bonding the first and second abutments results in an adhesive bond and wherein a length of the optical contact bond is coextensive with a length of the adhesive bond along at least one dimension of the first and second abutments.

13. An apparatus comprising:
(a) a first element having a first optical interface and a first abutment having a flatness of $\lambda/4$ or less;
(b) a second element having a second optical interface and a second abutment having a flatness of $\lambda/4$ or less;
(c) an optical contact bond between the first abutment of the first element and the second abutment of the second element wherein the optical contact bond comprises bonding forces between atoms of the first and second abutments; and
(d) an adhesive bond between the first abutment of the first element and the second abutment of the second elements;
wherein the first and second optical interfaces are free of adhesive to avoid impairing optical prorerties of the first and second optical interfaces.

14. An apparatus as claimed in claim 13, wherein:
(a) the second abutment defines a notch; and
(b) the adhesive bond comprises a bead of adhesive deposited within the notch, such that the adhesive adheres to both the notch and the first abutment when the first abutment is adjacent the second abutment.

15. An apparatus as claimed in claim 14, wherein the first element and the second element are in a roof configuration, wherein the first optical interface and the second optical interface meet at a junction.

16. An apparatus as claimed in claim 15, wherein:
(a) the first abutment is adjacent to and coplanar with the first optical interface; and
(b) the second abutment is adjacent to but not coplanar with the second optical interface.

17. An apparatus as claimed in claim 16, wherein the first optical interface and the second optical interface intermingle at the optical contact bond, forming a continuous optical interface through the junction.

18. An apparatus as claimed in claim 17, further comprising an optical coating deposited on the intermingled first optical interface and second optical interface.

19. An apparatus as claimed in claim 15 wherein a length of the adhesive bond spans the junction between the first and second optical interfaces.

20. An apparatus as claimed in claim 19 wherein a length of the optical contact bond spans the junction between the first and second optical interfaces.

21. An apparatus as claimed in claim 15 wherein the adhesive bond is spaced apart from the junction between the first and second optical interfaces.

22. An apparatus as claimed in claim 13 wherein a length of the optical contact bond is coextensive with a length of the adhesive bond along at least one dimension of the first and second abutments.

23. An apparatus comprising:
a first element having a first optical interface and a first abutment;
a second element having a second optical interface and a second abutment;
an optical contact bond between the first abutment of the first element and the second abutment of the second element; and
an adhesive bond between the first abutment of the first element and the second abutment of the second element;
wherein a length of the adhesive bond is coextensive with a length of the optical contact bond along at least one dimension of the first and second abutments.

24. An apparatus according to claim 23 wherein the first element and the second element are in a roof configuration such that the first optical interface and the second optical interface meet at a junction and wherein the length of the adhesive bond spans the junction.

25. An apparatus according to claim 23 wherein the first element and the second element are in a roof configuration such that the first optical interface and the second optical interface meet at a junction and wherein the adhesive bond is spaced apart from the junction.

* * * * *